United States Patent
Ostwald et al.

(10) Patent No.: US 6,480,759 B1
(45) Date of Patent: Nov. 12, 2002

(54) DIAGNOSTIC PORT BETWEEN INDEPENDENT ROBOTS

(75) Inventors: Timothy C. Ostwald, Lousiville, CO (US); Frank T. Smith, Neederland, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/602,549

(22) Filed: Jun. 23, 2000

(51) Int. Cl.[7] ............................................. G06F 19/00
(52) U.S. Cl. ...................... 700/245; 700/246; 700/248; 700/249; 700/251; 700/253; 700/259; 700/260; 707/104.1; 369/34; 235/375; 235/380; 235/385
(58) Field of Search ................................. 700/245, 215, 700/255, 262, 246, 248, 249, 251, 253, 259, 260, 110, 96; 707/104.1; 235/375, 380, 385, 383; 194/212; 360/92, 71, 48; 312/9.31, 9.17, 9.22; 369/34, 36, 178

(56) References Cited

U.S. PATENT DOCUMENTS

| | | |
|---|---|---|
| 4,362,977 A | 12/1982 | Evans et al. |
| 4,481,592 A | 11/1984 | Jacobs et al. |
| 4,590,578 A | 5/1986 | Barto, Jr. et al. |
| 4,761,745 A | 8/1988 | Kodaira |
| 4,763,276 A | 8/1988 | Perreirra et al. |
| 4,954,762 A | 9/1990 | Miyake et al. |
| 5,041,991 A | 8/1991 | Fujiki |
| 5,059,772 A * | 10/1991 | Younglove .................. 235/383 |
| 5,143,193 A * | 9/1992 | Geraci ........................ 194/212 |
| 5,323,327 A * | 6/1994 | Carmichael et al. ........ 700/215 |
| 5,333,242 A | 7/1994 | Watanabe et al. |
| 5,501,515 A * | 3/1996 | Dalziel ...................... 312/6.31 |
| 5,546,366 A * | 8/1996 | Dang ........................... 360/92 |
| 5,600,760 A | 2/1997 | Pryor |
| 5,894,461 A | 4/1999 | Fosler et al. |
| 5,925,119 A * | 7/1999 | Maroney ..................... 710/315 |
| 5,926,341 A * | 7/1999 | Mueller et al. ............... 360/92 |
| 5,999,356 A * | 12/1999 | Dimitri et al. ................. 360/71 |
| 6,175,466 B1 * | 1/2001 | Hori et al. ..................... 369/36 |

FOREIGN PATENT DOCUMENTS

| | | |
|---|---|---|
| EP | 0 887 719 | 12/1998 |
| JP | 10 194095 | 10/1998 |

OTHER PUBLICATIONS

Sun, Sun StoEdge L1800, 1998, Internet, pp. i–46.*
Sun, Library description, 1998, Internet, pp. 1–17.*
Sun, Control Panel Functions, 1998, Internet, 17–22.*
ATL 7100 Series Automated Tape Library for DLT Cartridges, 1997, Internet, pp. i–index–2.*
Quantum ATL, ACL 4/52 Automated Tape Library for DLT Cartridges, 2000, Internet, pp. i–52.*
AIT, TreeFrog Prouct Specfication, 1998, Internet, i–42.*

* cited by examiner

Primary Examiner—William A. Cuchlinski, Jr.
Assistant Examiner—McDieunel Marc
(74) Attorney, Agent, or Firm—Brooks & Kushman P.C.

(57) ABSTRACT

An automated storage library structure, a structure of at least one robot operating within the automated storage library, and a method of connecting the robot to test equipment to facilitate testing is disclosed. The robot is operative to move about the automated storage library on a guide structure. The test equipment is disposed in a diagnostics center associated with the automated storage library. Communication between the robot and the diagnostics center may be provided through a main connector, disposed adjacent to the guide structure at a predetermined position and electrically connected to the diagnostics center, and a test connector mounted on the robot's chassis and electrically connected to the robot's electronics. A second robot may be used to support testing of a sick robot. Support includes pushing or pulling a sick robot to the mating connector, providing an alternate communication path between the sick robot and the diagnostics center exclusive of the main connector, and conducting tests on the sick robot in place of the diagnostics center. Test equipment at the diagnostics center may include optical test equipment as well as electrical.

20 Claims, 7 Drawing Sheets

Fig. 12

DIAGNOSTIC PORT BETWEEN INDEPENDENT ROBOTS

TECHNICAL FIELD

The present invention is related to the field of diagnostics for robotic mechanisms operating within an automated storage library.

BACKGROUND ART

As automated storage libraries have become larger and more complex, their designs have evolved from a single robotic arm performing all data cartridge manipulations to multiple independent robots operating on several data cartridges simultaneously. This ability to manipulate several data cartridges simultaneously has increased the throughput of the automated storage libraries. While one independent robot is busy transferring one data cartridge from a storage cell to a media drive for mounting, a second independent robot can be transferring another data cartridge to an excess port, while a third independent robot may be conducting an inventory of the automated storage library.

Having multiple independent robots in operation within an automated storage library adds to the complexity of detecting and isolating failures of the individual robots. Each independent robot typically has some form of diagnostics built into its electrical, mechanical and optical circuits. This built-in diagnostic capability generally allows the robots to detect the loss of a major function, and may allow for fault isolation down to a single component or a group of components. Increasing the complexity of the built in diagnostics allows for more faults to be detected and bulk isolation to be more accurate. Built-in diagnostics, however, has practical limitations when applied to the robots. Increased diagnostics complexity adds to the overall cost, weight, volume and power consumption of each robot while reducing the mean time between failures. Furthermore, several common failure modes, such as the loss of electrical power, can leave the robot incapable of testing itself.

What is desired is a design approach and method of operation that allocates part of the diagnostic capabilities away from the independent robots and places it elsewhere within the automated storage library. Such an approach would help to minimize the cost of obtaining and operating the independent robots while still maintaining an acceptable level of fault detection and isolation within the automated storage library.

DISCLOSURE OF INVENTION

The present invention is a method of operating an automated storage library, the automated storage library structure, and the structure of independent robots operating within the automated storage library. The present invention divides a diagnostic capability for the independent robots between the robots themselves and a diagnostic center associated with the automated storage library. In operation, each robot is capable of mating itself with the diagnostic center to facilitate testing of the robot. Mating between the diagnostic center and an individual robot is performed through a pair of connectors. A main connector is electrically interfaced to the diagnostics center and is positioned within the automated storage library where it can be accessed by the robots. Each robot carries a test connector that is interfaced to the robot's electronics. Test connector is positioned on the robot's chassis and oriented with respect to the main connector such that the two connectors mate when the robot is approximately at a predetermined position adjacent to the main connector.

Automated storage libraries having multiple independent robots can use a second robot to assist in testing a first robot. Assistance by the second robot may include physically moving the first robot to the main connector, providing an alternate communication path between the first robot and the diagnostics center, and performing diagnostic tests on the first robot by the second robot itself. In order to support communications through the second robot or testing by the second robot, each robot may include a secondary connector mounted on the chassis. The secondary connector is also electrically interfaced to the robot's electronics and is oriented to mate with the test connector of another robot as if it were the main connector.

A switching matrix may be provided on each robot to assist in routing of test signals, commands and information between the robot's electronics, test connector and secondary connector. The switching matrix may be as simple as one-to-N multiplexer that allows for fan in/out between the test connector's conductors and the robots's electronics. More complex switching matrices may include cross point switches which allow individual signals to be selectively connected between the test connector, the secondary connector and the electronics.

The diagnostics center includes a variety of test hardware and software that can be interfaced to the robot under tests through the main connector. Optical inspection, stimulation, and optical sensing may also be provided at the diagnostics center to aid in testing the robot.

Accordingly, it is an object of the present invention to provide an automated storage library having at least one robot therein, and method of operation wherein at least part of the diagnostic testing of the robot is performed from a diagnostics center to which the robot can mate.

Yet another object of the present invention is to provide a robot for use in the automated storage library wherein the robot is capable of mating with the diagnostics center to facilitate testing of the robot.

Yet another object of the present invention is to provide a method of operating an automated storage library having multiple robots wherein a second robot supports testing of a first robot.

These and other objects, features, and advantages will be readily apparent upon consideration of the following detailed description in conjunction with the accompanying drawings.

BEST MODE FOR CARRYING OUT THE INVENTION

A high level of diagnostics for multiple independent robots 100 operating within an automated storage library 102 can be achieved by supplying a large amount of diagnostics hardware and software within an automated storage library 102. To avoid a high monetary, power, weight, volume, and reliability expense caused by duplicating the diagnostic equipment on each independent robot 100, the present invention divides the diagnostic equipment into two groups. A first group is internal diagnostic equipment built into each robot 100. A second group consists of external diagnostic equipment accessible to the robots 100 at one or more locations within the automated storage library 102. To utilize the external diagnostic equipment, a selected robot 100 to be tested is moved to one of the access positions and electrically interfaced to the external diagnostic equipment.

Figure 1:
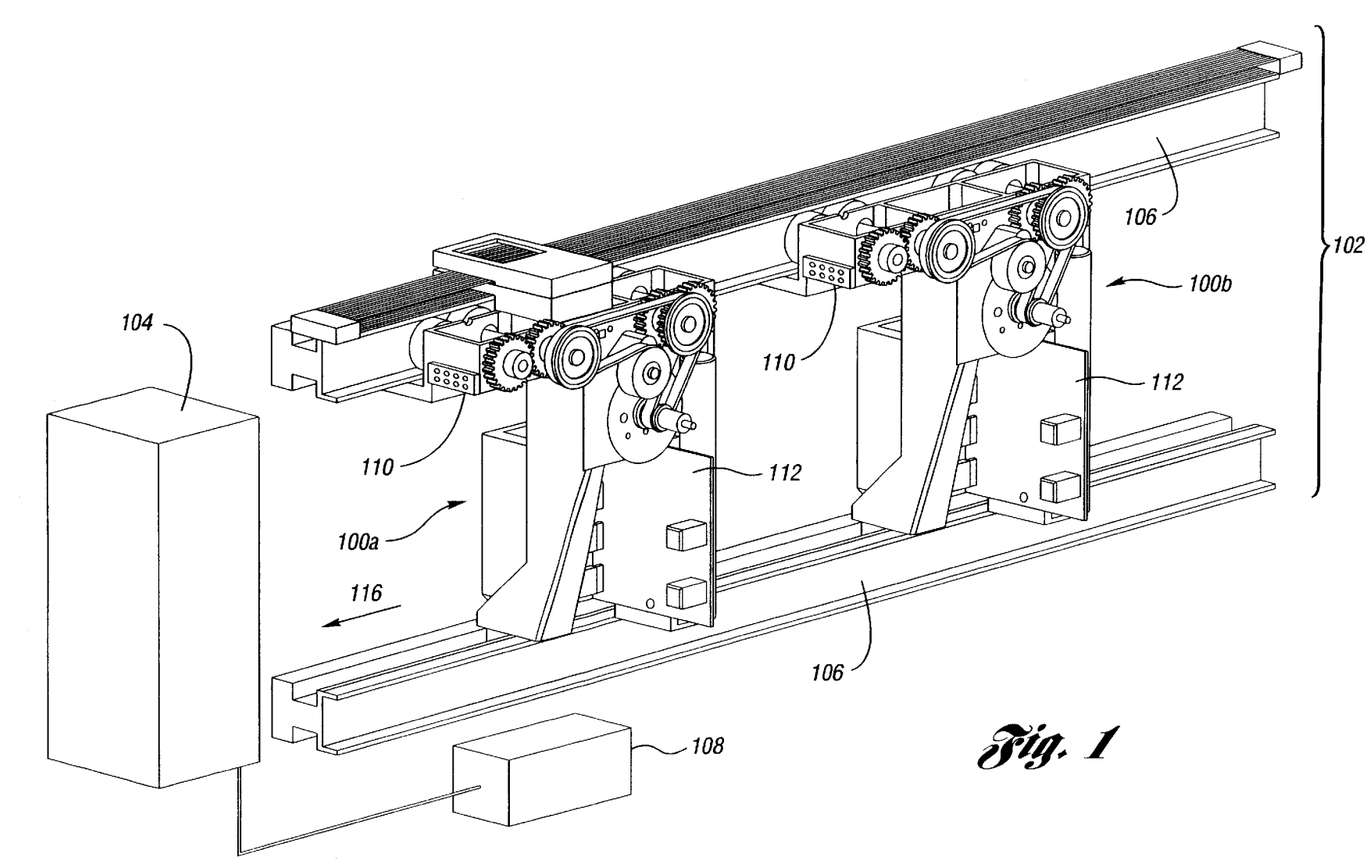
FIG. 1 is a partial perspective view of two robots near the diagnostics center.

FIG. 1 shows an automated storage library 102 that implements the present invention. The external diagnostics equipment is located in a diagnostic center 104 at a predetermined position within the automated storage library 102. Multiple independent robots 100a–b move about the automated storage library 102 on a track, rail, or other suitable guide structure 106. Coordination of the robots 100a–b is provided by one or more controllers 108 associated with the automated storage library 102 system. Coordination includes intra-library movement of data cartridges (not shown) among storage cells (not shown) and media drives (not shown), and inter-library movement of data cartridges between individual library units (not shown), and to and from access ports (not shown) where data cartridges are inserted and removed from the automated storage library 102.

Diagnostics for each robot 100a–b can be performed at multiple levels. A first level of diagnostics is an on-board self-test capability. Each robot 100a–b is capable of testing itself to determine whether or not a fault exists in any one of its major functions or subsystems. A second level of diagnostics involves the use of external diagnostic equipment located in the diagnostic center 104. To facilitate testing of a selected robot 100a by the diagnostic center 104, the selected robot 100a to be tested must first be moved along the guide structure 106 to a predetermined position where it can be connected to the diagnostic center 104.

Electrical connections are established between the diagnostic center 104 and the robot 100a to be tested through a pair of mating connectors. One-half of the mating pair is referred to as a test connector 110. Test connectors 110 are mounted on a chassis 112 each of the independent robots 100. The other half of the mating pair is referred to as a main connector 114. The main connector 114 is positioned inside the automated storage library 102 at the predetermined position along the guide structure 106. Wiring between the main connector 114 and the diagnostic center 104 establishes an electrical interface between the two. This allows the diagnostic center 104 to be physically located either inside or outside the automated storage library's housing (not shown).

Mating of the test connector 110 and the main connector 114 may be accomplished by moving the robot 100a to be tested in the direction of arrow 116. The robot 100a to be tested in essence plugs itself into the diagnostic center 104. An electrical interface is established between the test connector 110 and the main connector 114 when the robot 100a to be tested is located approximately the predetermined position along the guide structure 106. Test connector 110 and main connector 114 may include physical self-aligning features that assist in achieving the electrical connections. The connectors 110 and 114 may be oriented with respect to each other so that multiple contacts (not shown) in each connector 110 and 114 mate co-axially, as in a pin and socket arrangement, in a planer fashion, as in a circuit board and wiper arrangement, or in any other fashion where the two connectors 110 and 114 are moved in a linear fashion toward each other.

Figure 2:
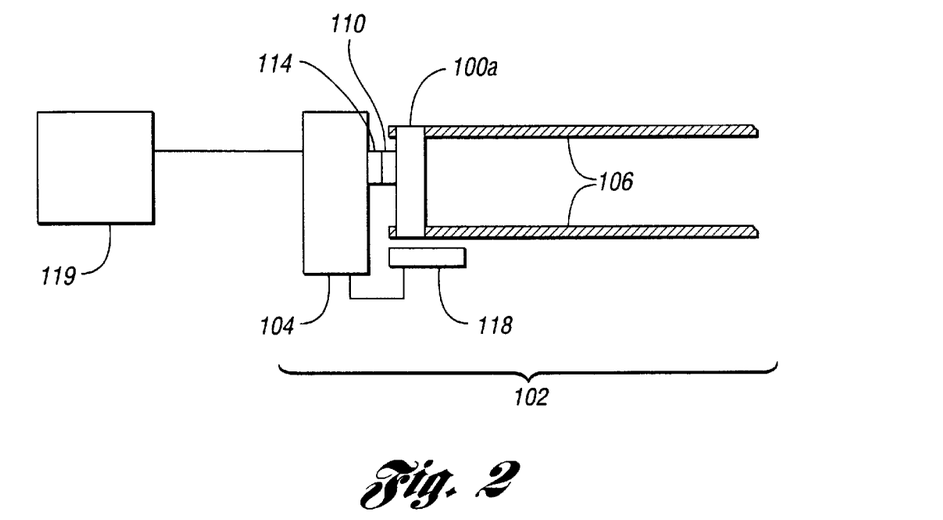
FIG. 2 is a side view of a robot mated with the diagnostic center.

A braking mechanism 118 may be provided near the main connector 114, as shown in FIG. 2. The braking mechanism 118 holds the robot 100a to be tested stationary so that the test connector 110 and main connector 114 remain mated during testing. Braking mechanism 118 may include alignment features that bring the robot 100a to be tested into fine alignment with the predetermined position along the guide structure 106. With the robot 100a to be tested locked in place, the diagnostic center 104 can perform a series of electrical, electromechanical, and electro-optical tests on the robot 100a. A service center 119 remotely located from the automated storage library 102 may be in communication to support testing, and possibly to receive test results for various purposes including, but not limited to further analysis and historical tracking purposes. Once testing has been completed, the braking mechanism 118 releases the robot 100a which is then free to move away from the main connector 114 and continuous normal operations. If the robot 100a was found to have serious problems, it may be moved to an out of the way position along the guide structure 106 or to a service port (not shown) where it can be removed from the automated storage library 102 for repairs.

In its simplest form, each contact of the test connector 110 is permanently wired to a selected test point within the robot 100. Test points may include voltage, ground, analog signals, and digital signals. Voltages and wave forms at each of these test points are relayed out of the robot 100a under tests through the mated test connector 110 and main connector 114 to appropriate test equipment in the diagnostic center 104. Some of the discrete lines may be used to carry information and data originating at the diagnostic center 104 to the electronics of the robot 100a under test. For example, discrete reset lines may be provided to reset a microprocessor or other circuits within the robot 100a under test. In another example, the diagnostic center 104 may provide a reference voltage to the robot 100a under test to aid in one or more tests of voltage sensitive electronics of the robot 100a.

Figure 3:
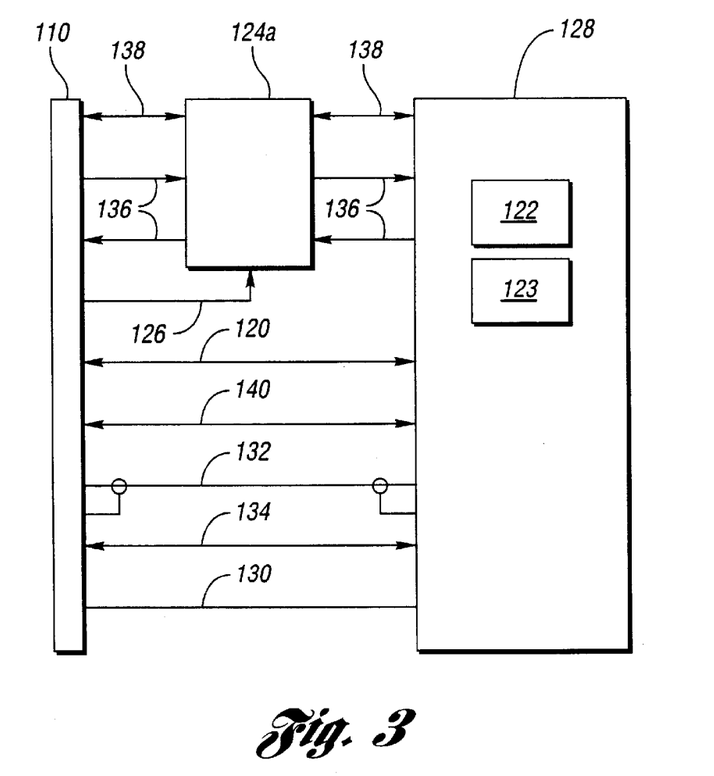
FIG. 3 is a partial schematic showing the test connector interfacing to the robot's electronics.

Referring to FIG. 3, bussing, multiplexing, and bi-directional schemes may be employed to provide more efficient use of the discrete contacts within the test connector 110 and main connector 114. A bus 120 may be routed through the test connector 110 to establish communications between the diagnostic center 104 and any microprocessors 122 incorporated within the robot 100. The bus 120 may use a point-to-point architecture, a linear multi-drop architecture, a ring architecture, and the like. In the preferred embodiment, electrical wires are used for the physical form of the bus 120. In alternative embodiments, optical, acoustic, and radio frequency forms may be employed. The bus 120 allows the diagnostic center 104 to issue commands, read test results, read the contents of any on-board memory 123, write to the on-board memory 123, and so on.

A switching matrix 124 may be incorporated between the test connector 110 and the electronics to improve the fan in/out capability of test connector 110. The switching matrix 124 may be as simple as one or more one-to-N multiplexors 124a. Each multiplexor 124a is controlled by an address input 126 from the diagnostic center 104 to control the test points and signals interfaced to the diagnostic center 104. A more complicated form of switching matrix 124, such as a cross-point switching matrix 124b (shown in FIG. 8), may be used to establish unidirectional and bi-directional interfaces between the diagnostic center 104 and the electronics of the robot 100 under test.

A variety of other connections may be provided between the test connector 110 and electronics 128 of each robot 100. Examples include, but are not limited to grounds 130, coaxial and triaxial connections 132 for video signals and low noise signals, twisted pairs 134, uni-directional connections 136, bi-directional connections 138, and multi-signal parallel connections 140.

Figure 4:
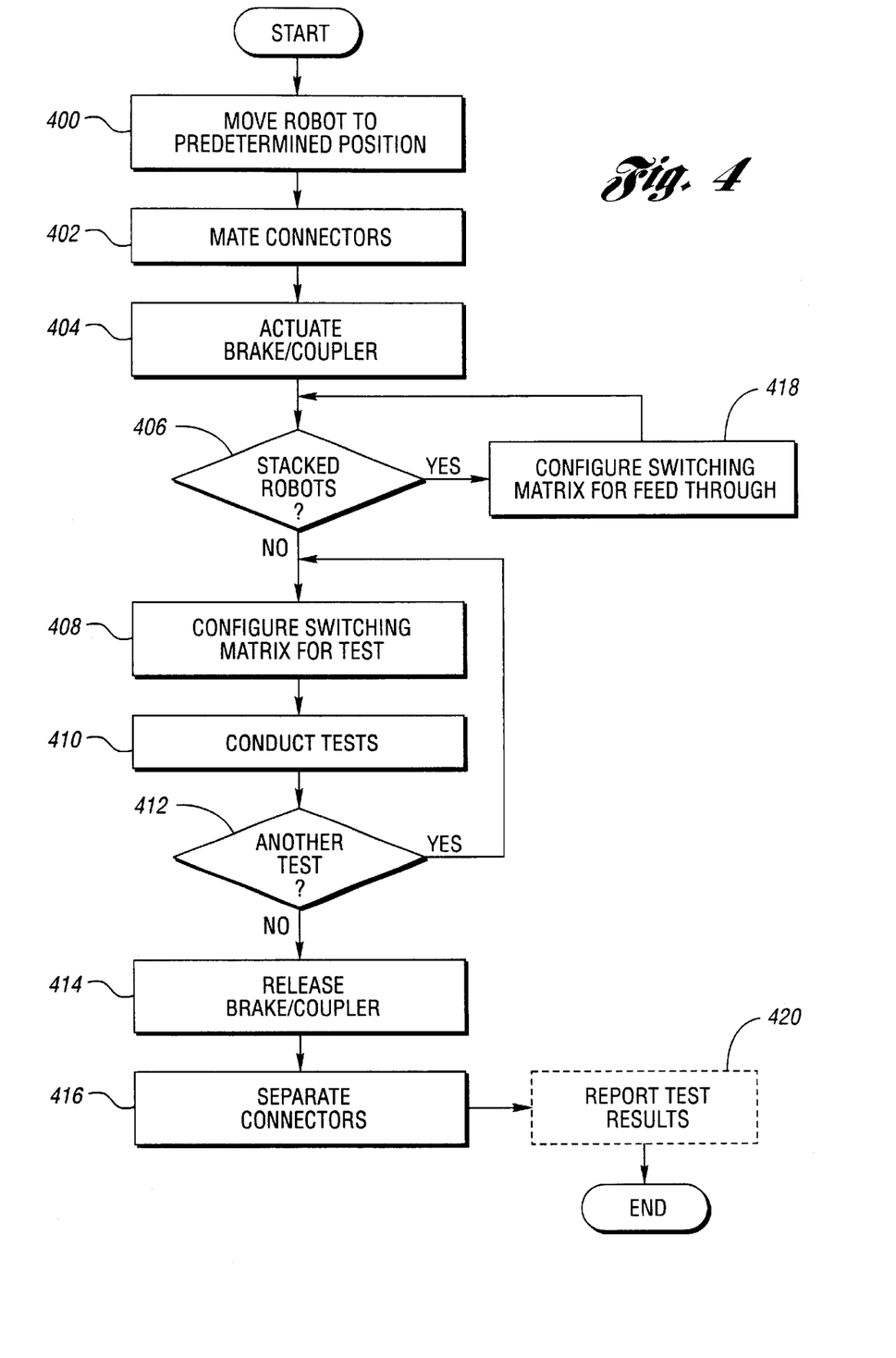
FIG. 4 is a flow diagram for a method of testing a robot from either the diagnostics center or another robot.

Referring to FIG. 4, testing of a robot 100a by the diagnostic center 104 is initiated by moving the robot 100a to be tested to the predetermined position adjacent to the main connector 114, as shown in block 400. As the robot 100a to be tested reaches the predetermined position, test connector 110 on the robot 100a mates with the main connector 114, as shown in block 402. Next, the braking mechanism 118 is activated to hold the robot 100a to be tested in place, as shown in block 404.

The diagnostic center 104 will then perform a check, decision block 406, to determine if more than one robot 100 is stacked at the main connector 114. (Stacking means that a first robot 100 is interfaced directly to the main connector 114, a second robot 100 is interfaced to the first robot 100, a third robot 100 is interfaced to the second robot 100, and so on.) By way of example, it will be assumed that only one robot 100a is interfaced to the main connector 114. The possibility of having multiple robots 100 present will be discussed in further detail at a later time. The diagnostic center 104 then issues commands to the robot 100a to be tested to program the switching matrix 124 in the robot 100 into an appropriate configuration for a first test or set of tests, as shown in block 408. Testing of the robot 100a is then initiated, as shown by block 410. Upon completion of the initial test, a check is made to determine if additional tests should be performed, as shown by decision block 412. Where there are additional tests to be performed, as shown by the YES branch of decision block 412, then the configuration of the switching matrix 124 is updated and the next test performed. This loop is repeated until all the tests have been conducted, as indicated by the NO branch of decision block 412.

Upon completion of the last test, the braking mechanism 118 is deactivated to free the robot 100a just tested, as shown in block 414. The controller 108 then commands the robot 100a to move away from the predetermined position and main connector 114. This movement causes the test connector 110 and the main connector 114 to separate, as shown by block 416, thus isolating the robot 100a from the diagnostic center 104 thus ending the test sequence. Phantom block 420 is required only if another robot 100 has tested the robot 100a. This will be discussed in more detail later.

Certain severe failure modes may make it impossible for a robot 100a to be tested to receive or respond to a command to move to the main connector 114. Here, the presence of additional independent robots 100 may be useful to assist in testing a sick robot 100a. A healthy robot 100b may be brought along side the sick robot 100a to be tested and used to push the sick robot 100a to be tested to the main connector 114. Afterwards, the healthy robot 100b may be returned to its normal operations while the sick robot 100a under test is tested by the diagnostic center 104.

Figure 5:
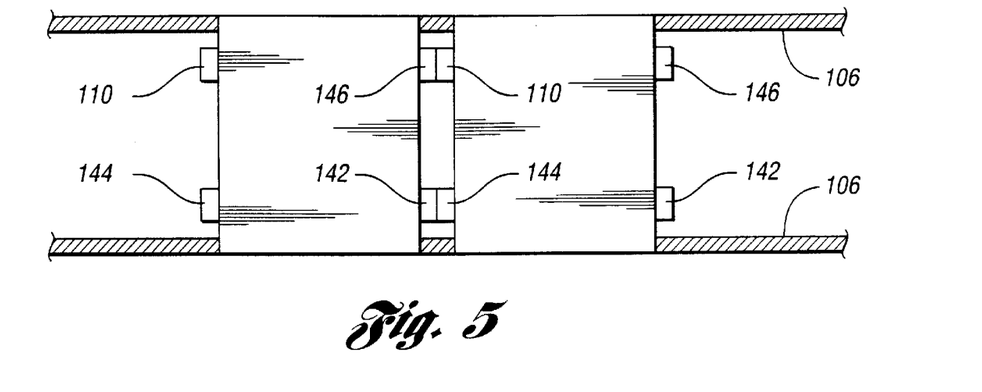
FIG. 5 is a side view of a first robot mated to a second robot.

Depending upon the configuration of the guide structure 106 or the distribution of the other robots 100, it may not be possible or practical for the healthy robot 100b to position itself to push the sick robot 100a to be tested. Instead, the healthy robot 100b may be required to pull the sick robot 100a to the main connector 114. Referring to FIG. 5, the ability of one robot 100b to pull another can be implemented by providing each robot 100a–b with a coupler 142 and a corresponding coupling feature 144. The coupler 142 and corresponding coupler feature 144 allows each robot 100a–b to physically connect with another robot 100a–b in order to pull the other robot 100a–b. In the preferred embodiment, the coupler 142 is designed to allow one robot 100b to propel the other robot 100a in either direction, by pushing or pulling. The coupler 142 and associated coupling feature 144 may be mechanical, electromechanical, or magnetic in nature. They may operate passively, for example, as opposite poles of simple bar magnets. In other embodiments, the coupler may be active. For example, the coupler 142 may incorporate an actuator (not shown) which allows the coupler 142 to grab and release the associated coupling feature 144 on another robot 100a–b.

Figure 6:
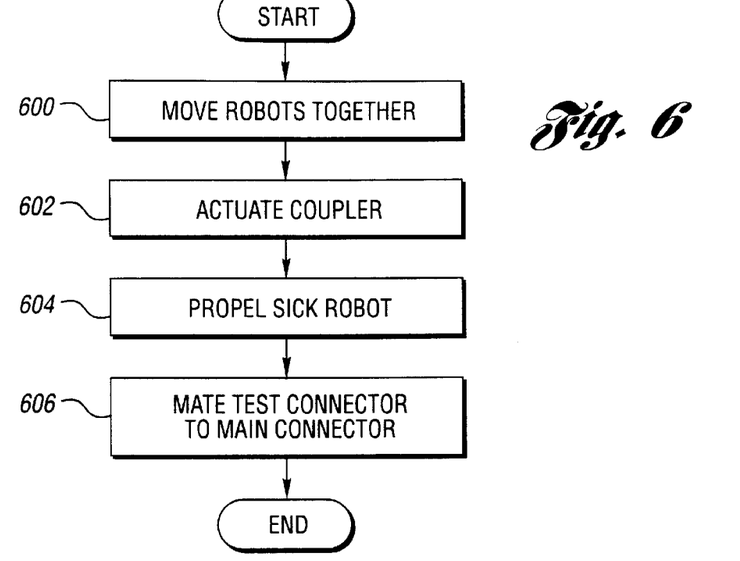
FIG. 6 is a flow diagram of a method for propelling one robot with another robot.

FIG. 6 is a flow diagram of a method of propelling one robot 100a using another robot 100b. The method starts by moving the two robots 100a–b relative to each other until they are adjoining one another, as shown in block 600. This may involve moving the healthy robot 100b to the sick robot 100a, moving the sick robot 100a to the healthy robot 100b, or moving both robots 100a–b simultaneously. Once the robots 100a–b are adjoining, the coupler is activated, if necessary, to physically couple the robots 100a–b together as shown in block 602. The healthy robot 100b then propels the sick robot 100a by pushing or pulling it towards the mating connector, as shown in block 604. If pushing, the healthy robot 100b stops pushing once the test connector 110 of the sick robot 100a mates with the main connector 114, as shown in block 606. If pulling, the healthy robot 100b stops pulling once its test connector 110 mates with the main connector 114, also as shown in block 606.

If the healthy robot 100b has pushed the sick robot 100a to the main connector 114, then the healthy robot 100b is free to uncouple at this point and return to its other operations. Here, the braking mechanism 118 may be helpful in separating the coupled robots 100a–b. While the braking mechanism 118 holds the sick robot 100a to be tested stationary, the healthy robot 100b may move away. This will cause the coupler 142 to release from the coupler feature 144 thus isolating the two robots 100a–b.

Referring again to FIG. 5, each robot 100 may also be provided with a secondary connector 146 which is similar to or identical to the main connector 114 used by the diagnostic center 104. The secondary connectors 146 are positioned on the robots 100 to mate with the test connectors 110 of another robot 100 while the two robots 100 are adjoining. As will be shown later, each robot 100 may also include a feed-through function between the test connector 110 and the secondary connector 146 which allows the diagnostic center 104 to communicate with the sick robot 100a under test through another robot 100, such as the health robot 100*b*. This feature is useful when a healthy robot 100*b* must pull a sick robot 100*a* to the main connector 114 and thus becomes physically and electrically positioned between the main connector 114 and the test connector 110 of the sick robot 100*a*.

The presence of the secondary connector 146 on each robot 100 allows the healthy robot 100*b* to act as a miniature mobile diagnostic center 104. Once the secondary connector 146 of the healthy robot 100*b* has been mated with the test connector 110 of the sick robot 100*a*, then the healthy robot 100*b* can conduct diagnostic tests on the sick robot 100*a*.

Figure 7:
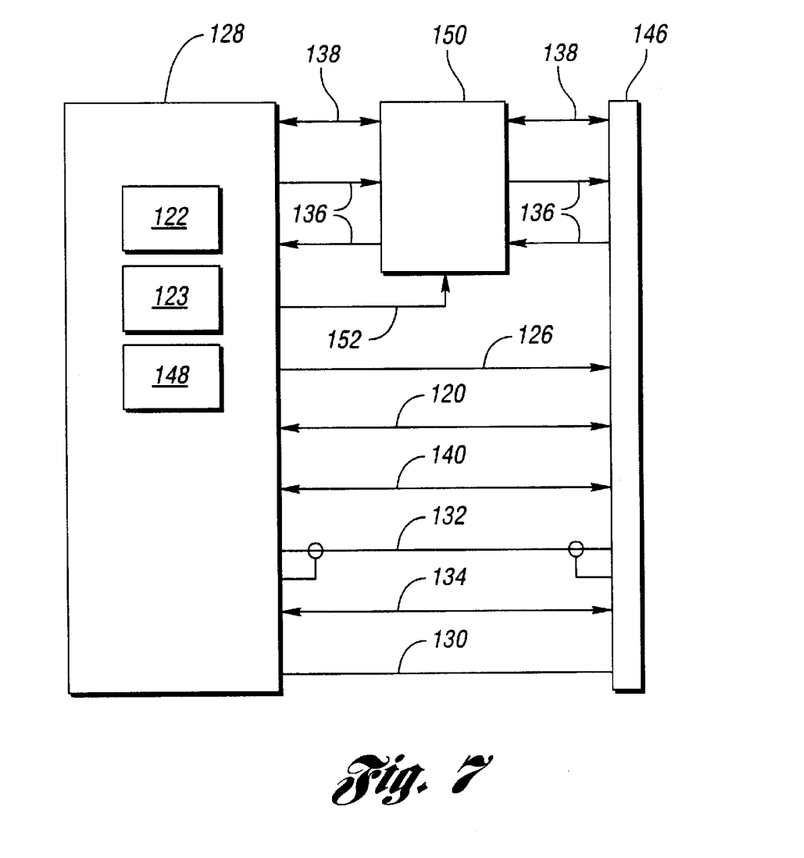
FIG. 7 is a partial schematic showing a secondary connector interfacing to the robot's electronics.

Referring to FIG. 7, the electronics of each robot 100 may include diagnostic circuits 148 that may be interfaced to the secondary connector 146 to facilitate testing of another robot 100. The electrical interface between the electronics 128 and the secondary connector 146 is similar to the interface between the electronics 128 and the test connector 110. The secondary connector 146 may include discrete lines, multi-plexed lines, unidirectional lines, bi-directional lines, and the like. A second switching matrix 150 may be provided between the electronics and the secondary connector 146 to accommodate fan in/out to the contacts of the secondary connector 146. This second switching matrix 150 is similar to the switching matrix 124 connected to the test connector 110 except that the address lines 152 of the second switch matrix 150 are controlled from internally whereas the address lines 126 are controlled from an external source.

The method of testing the sick robot 100*a* from the healthy robot 100*b* is similar to the method of testing the sick robot 100*a* from the diagnostic center 104 as shown in FIG. 4. Three main differences exist between the two procedures. A first difference is that the healthy robot 100*b* may move to the sick robot 100*a*, as opposed to the sick robot 100*a* moving to the mating connector. A second difference is that the healthy robot 100*b* may activate and deactivate the coupler 142, as opposed to the diagnostic center 104 activating and deactivating the braking mechanism 118. A third difference is that the test results for the sick robot 100*a* need to be reported to the diagnostic center 104 by the healthy robot 100*b*, as shown in block 420. This may be accomplished by mating the test connector 110 of the healthy robot 100*b* with the main connector 114, then transferring the test results through the main connector 114. Alternatively, test results may be reported to the diagnostic center 104 through a communication path established through the transceiver 154 of the healthy robot 100*b* and the controller 108.

Figure 8:
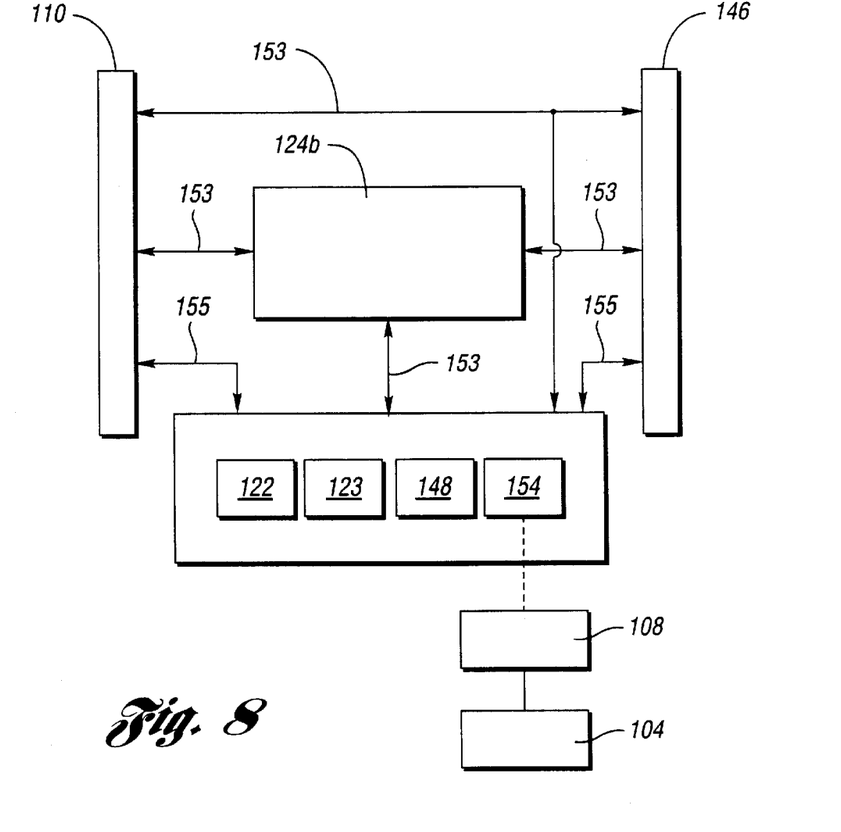
FIG. 8 is a partial schematic showing an alternate embodiment of the robot.

Another embodiment of the electronics 128 of a robot 100 are shown in FIG. 8. Here, the switching matrix 124 is a cross point type switching matrix 124*b* disposed among the test connector 110, the secondary connector 146, and the remaining electronics 128. This cross point type switching matrix 124*b* allows various signals 153 to be routed between the test connector 110 and the electronics 128, between the secondary connector 146 and the electronics 128, or between both the test connector 110 and the secondary connector 114, and the electronics 128 simultaneously. The cross point type switching matrix 124*b* also provides the feed-through capability to allow signals 153 to be routed directly between the test connector 110 and the secondary connector 146. Other signals 153 that may be routed directly between the test connector 110 and the secondary connector 146 around the cross point type switching matrix 124*b*. These may include, but are not limited to, ground signals, linear multi-drop busses, and common discrete signals. Point-to-point discrete signals 155 may still be provided between the test connector 110 and the electronics 128, and between the electronics 128 and the secondary connector 146 where stacking of robots 100 is not a factor.

The electronics 128 of the robots 100 will often contain a transceiver 154 to allow the robot 100 to communicate with the controller 108 for the automated storage library 102. Typically, the transceiver 154 and controller 108 form a bi-directional communication link. This link may be wireless in using radio frequency or optical signals, or routing through the guide structure 106 using capacitive or inductive coupling. By creating another communication path between the controller 108 and the diagnostic center 104, a robot 100 and diagnostic center 104 can communicate with each other via the controller 108. Now the diagnostic center 104 can send commands to the robot 100 to perform various on board diagnostics tests, and receive test results back without requiring the robot 100 to mate with the main connector 114. Using the capabilities of the cross point type switching matrix 124*b*, this diagnostic capability can be extended further to send commands and receive test data from a sick robot 100*a* mated to the test connector 110 or the secondary connector 146 of the healthy robot 100*b* through the transceiver 154 of the healthy robot 100*b*.

Figure 9:
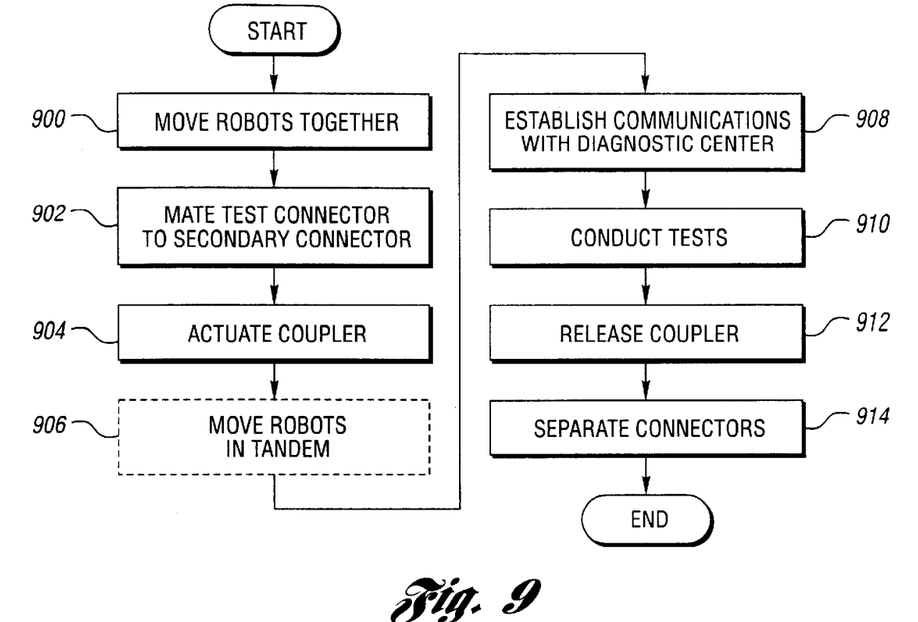
FIG. 9 is a flow diagram wherein the robot under tests is in communication with the diagnostics center through a second robot.

FIG. 9 is a flow diagram of a method for testing a sick robot 100*a* with the assistance of a healthy robot 100*b* exclusive of the main connector 114. This procedure starts by relatively moving the healthy robot 100*b* and the sick robot 100*a* towards each other, as shown in block 900. As before, the relative motion may be moving the healthy robot 100*b* towards the sick robot 100*a*, moving the sick robot 100*a* towards the healthy robot 100*b*, or moving both simultaneously. This relative movement results in mating the test connector 110 of one robot 100*a–b* with the secondary connector 146 of the other robot 100*a–b*, as shown in block 902. Using the configuration shown in FIG. 8, it does not matter if the test connector 110 is on the sick robot 100*a* and the secondary connector 146 is on the healthy robot 100*b*, or vice versa. What matters are that there are two connectors 110 and 146 than can mate with each other and that one is mounted on each of the robots 100*a* and 100*b*.

Once the robots 100*a–b* have mated, the appropriate coupler 142 is activated, as shown in block 904, to physically hold the two robots 100*a–b* together during the tests. While the robots 100*a–b* are coupled together, they may remain stationary on the guide structure 106, or move along the guide structure in tandem, as shown in phantom block 906.

If it has not done so already, the healthy robot 100*b* establishes communication with the diagnostic center 104 using its on-board transceiver 154, as shown in block 908. The diagnostic center 104 may now communicate with the sick robot 100*a* through the healthy robot 100*b* to conduct testing of the sick robot 100*a*, as shown in block 910. Once testing has been completed, the coupler 142 is deactivated releasing the two robots 100*a–b*, as shown in block 912. The healthy robot 100*b* and sick robot 100*a* then move apart from each other, separating the coupler 142 and coupler feature 144, as shown in block 914.

The feed-through capability of the cross point type switching matrix 124*b* also allows for several robots 100 to be stacked or daisy-chained at the main connector 114 for test purposes. This is the case when a healthy robot 100*b* assists in testing a sick robot 100*a* by pulling the sick robot 100*a* to the main connector 114 and thus is physically and electrically positioned between the main connector 114 and the test connector 110 of the sick robot 100*a*. Referring back to decision block 406 in FIG. 4, when the diagnostic center 104 determined that there are robots 100 stacked at the main connector 114, the YES branch of decision block 406, then the switching matrix 124 of the healthy robot 100b is configured for feed-through, as shown in block 418. In other words, looking from the test connector 110 of the sick robot 100a back into the secondary connector 146 of the healthy robot 100b it appears to the sick robot 100a that it is electrically mated directly to the main connector 114. For situations where the sick robot 100a is third, or further down in a stack of robots 100, then the configuration of the cross point type switching matrices 124b of each intermediate robots 100 may be repeated until all of the intermediate robots 100 between the main connector 114 and the sick robot 100a are in the feed-through configuration.

Figure 10:
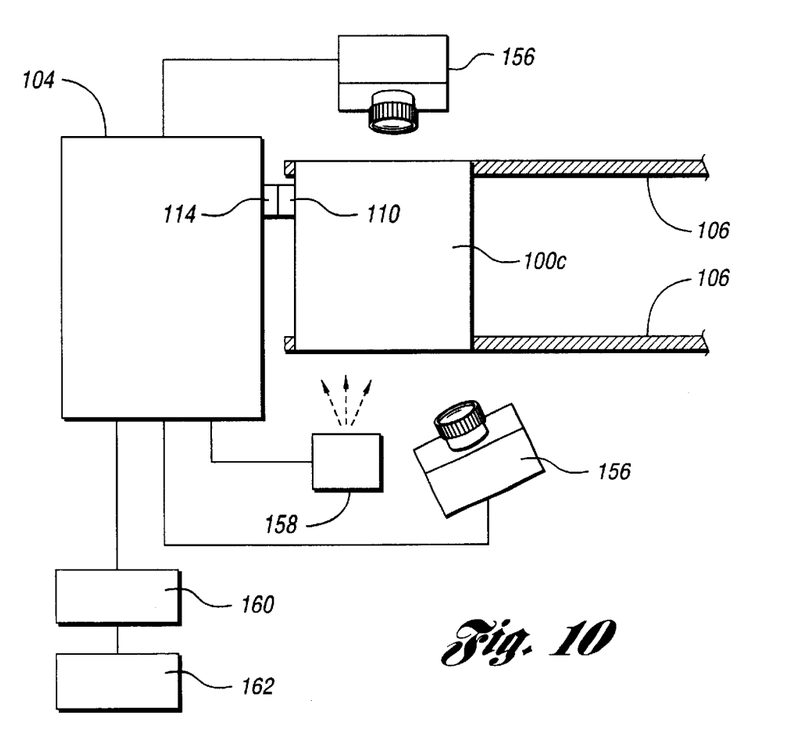
FIG. 10 is a side view of the diagnostics center having cameras.

Testing of the robots 100 may include optical tests as well as the electrical tests that can be performed through the main connector 114, or another robot 100. FIG. 10 shows one example of an optical test wherein one or more cameras 156 are included in the diagnostic center 104 to provide images of the robot 100c under test. The cameras 156 may be mounted in different positions around the main connector 114 to give views of the robot 100c under test from different perspectives. Where the cameras 156 operate in the visible spectrum, a light source 158 may be provided to illuminate the robot 100c under test. Cameras 156 operating in the infrared may be employed to look for hot spots on the robot 100c under test. Images produced by the cameras 156 may be displayed on a monitor 160 to an operator 162 conducting the tests. This approach provides vital visual information about the health of the robot 100c under test that cannot always be obtained from electrical test points.

Figure 11:
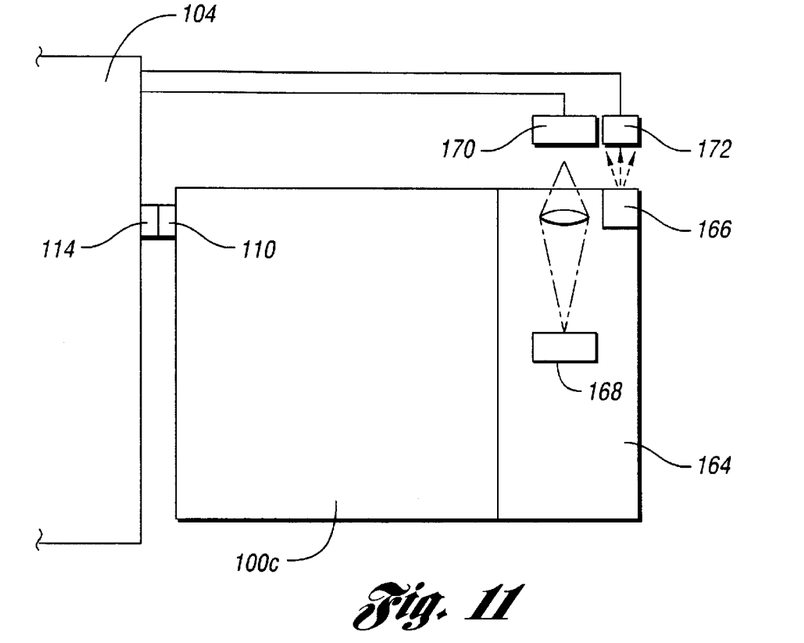
FIG. 11 is a partial cut-away view showing optical test equipment for a bar code reader mounted on the robot.

The diagnostic center 104 may also provide optical test equipment to stimulate and measure optical sources and sensors commonly carried on the robot 100. FIG. 11 shows an example of a bar code reader 164 mounted on the robot 100c under test. The bar code reader 164 includes a light source 166 to illuminate bar codes (not shown) normally found on data cartridges (not shown), and an optical sensor 168 to read the bar codes. A test pattern generator 170 may be provided at the diagnostic center 104 to emulate the bar codes normally found on the data cartridges. Here, the test pattern generator 170 is positioned to align with the bar code reader 164 when the robot 100c under test is at the predetermined position and mated with the main connector 114. The test pattern generator 170 may be as simple as a standard bar code label permanently mounted adjacent to the guide structure 106, or as complicated as a software control display panel that can generate varying patterns of light and dark to represent multiple bar codes. A light sensor 172 may also be provided alongside the test pattern generator 170 to measure if the light source 166 of the bar code reader 164 is, in fact, producing light.

Figure 12:
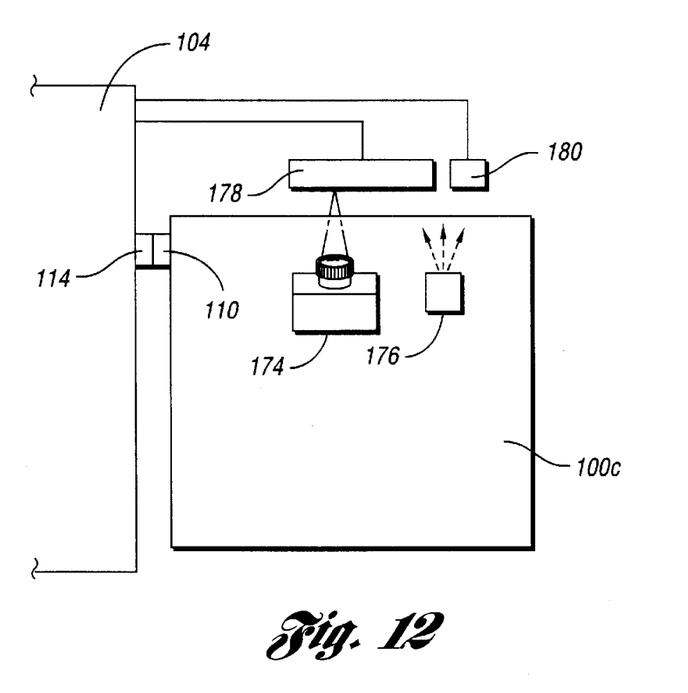
FIG. 12 is a partial cut-away view showing optical test equipment for a camera mounted on the robot.

FIG. 12 is another example wherein the robot 100c under test carries an on-board camera 174. Here, the on-board camera 174 provides the automated storage library 102 user (not shown) with images of the inside of the automated storage library 102 as seen from the robot's 100c point of view. Another light source 176 carried by this robot 100c may be provided to illuminate the interior of the automated storage library 102 within the field of view of the on-board camera 174. Testing of this on-board camera 174 and light source 176 is similar to testing of the bar code reader 164. Another test pattern generator 178 is positioned adjacent to the guide structure 106 to align with the on-board camera 174 while the robot 100c is at the predetermined position. This test pattern generator 178 may range from a simple static test pattern to a programmable color display. Another light sensor 180 may be disposed adjacent to the test pattern generator 178 to determine if the light source 176 carried by the robot 100c is operational.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automated storage library comprising:

a main connector;

a diagnostic center connected to the main connector;

a robot having a test connector, the robot being operative to mate the test connector and the main connector to enable the diagnostic center to test the robot; and a camera disposed near the main connector and connected to the diagnostic center to provide images of the robot to the diagnostic center.

2. An automated storage library comprising:

a main connector;

a diagnostic center connected to the main connector;

a robot having a test connector, the robot being operative to mate the test connector and the main connector to enable the diagnostic center to test the robot;

an optical sensor disposed on the robot; and an optical test pattern generator disposed near the main connector to test the optical sensor while the robot is adjacent to the main connector.

3. An automated storage library comprising:

a main connector;

a diagnostic center connected to the main connector;

a robot having a test connector, the robot being operative to mate the test connector and the main connector to enable the diagnostic center to test the robot;

a light source disposed on the robot; and a light sensor disposed near the main connector to test the light source while the robot is adjacent to the main connector.

4. An automated storage library comprising:

a main connector;

a diagnostic center connected to the main connector;

a robot having a test connector, the robot being operative to mate the test connector and the main connector to enable the diagnostic center to test the robot; and a brake mechanism disposed adjacent to the main connector to hold the robot stationary.

5. A robot for use in an automated storage library having a guide structure, a main connector disposed at a predetermined position adjacent to the guide structure, and a diagnostic center connected to the main connector, the robot comprising:

a chassis operative to move along the guide structure; and a test connector disposed on the chassis and oriented to mate with the main connector while the chassis is at approximately the predetermined position, the test connector being electrically connected to the chassis to enable the diagnostic center to test the robot.

6. The robot of claim 5 further comprising a secondary connector disposed on the chassis and oriented to mate with a second test connector of a second robot, the secondary connector being electrically connected to the chassis to enable inter-robot communications between the robot and the second robot while mated.

7. The robot of claim 6 further comprising a diagnostic circuit disposed on the chassis and operative to test the second robot while mated.

8. The robot of claim 6 further comprising a switching matrix connected between the test connector and the secondary connector to enable feed-through communications between the test connector and the secondary connector.

9. The robot of claim 6 further comprising a transceiver disposed on the chassis and capable of communicating with the diagnostic center to enable the diagnostic center to test the second robot through the transceiver while the robot and the second robot are mated.

10. The robot of claim 5 further comprising a coupler disposed on the chassis to physically connect the robot to a second robot.

11. A method of testing a robot, wherein the robot has a test connector, and a diagnostic center is connected to a main connector, the method comprising:

moving the robot toward the main connector to mate the test connector and the main connector; and testing the robot with the diagnostic center through the main connector and the test connector.

12. The method of claim 11 wherein the robot has a secondary connector, the method further comprising:

providing a second robot having a second test connector; and mating the secondary connector and the second test connector to enable inter-robot communications between the robot and the second robot.

13. The method of claim 12 further comprising:

linking the test connector of the robot and the secondary connector of the robot together electrically; and testing the second robot with the diagnostic center through the robot.

14. The method of claim 11 further comprising providing a second robot, and wherein moving the robot toward the main connector includes propelling the robot with the second robot toward the main connector.

15. A method of testing a first robot, wherein the first robot has a first connector, and a second robot has a second connector, the method comprising:

relatively moving the first robot and the second robot toward each other to mate the first connector and the second connector; and testing the first robot through the first connector and the second connector.

16. The method of claim 15 wherein relatively moving the first robot and the second robot toward each other comprises moving the first robot toward the second robot and the second robot remaining stationary.

17. The method of claim 15 further comprising moving the first robot and the second robot in tandem while testing the first robot to enable the second robot to perform other tasks.

18. The method of claim 15 wherein testing the first robot comprises testing the first robot with the second robot.

19. The method of claim 18 further comprising reporting a test result from the second robot to a diagnostic center in response to testing the first robot with the second robot.

20. The method of claim 15 wherein the second robot has a transceiver capable of communicating with a diagnostic center, the method further comprising:

establishing communications between the transceiver and the diagnostic center; and testing the first robot with the diagnostic center through the transceiver of the second robot.

* * * * *